United States Patent [19]

Ito et al.

[11] 4,175,146

[45] Nov. 20, 1979

[54] METHOD FOR IMPROVING THE PROPERTIES OF NATURAL PRODUCTS COMPOSED MAINLY OF CALCIUM CARBONATE

[75] Inventors: Tateo Ito, Kamakura; Tomijiro Kaneko, Tokyo, both of Japan

[73] Assignee: Obata Industry & Commerce Co., Ltd., Tokyo, Japan

[21] Appl. No.: 941,665

[22] Filed: Sep. 12, 1978

[30] Foreign Application Priority Data

Oct. 6, 1977 [JP] Japan ............................... 52-119509

[51] Int. Cl.$^2$ .......................... B05D 3/00; B05D 3/10
[52] U.S. Cl. ........................................ 427/304; 427/4; 427/343; 427/399; 427/430 R; 427/430 A; 427/430 B; 428/15; 428/538
[58] Field of Search ............. 428/15, 538; 427/430 R, 427/430 A, 430 B, 4, 343, 399, 304

[56] References Cited

U.S. PATENT DOCUMENTS

| 2,211,593 | 8/1940 | Colton et al. ................. 427/430 B X |
| 2,288,633 | 7/1942 | Luckhaupt .................... 427/430 B X |
| 3,403,035 | 9/1968 | Schneble et al. ................ 427/430 A |
| 3,943,267 | 3/1976 | Randol ...................................... 427/2 |
| 3,955,018 | 5/1976 | Liberto ................................. 427/4 X |
| 3,995,371 | 12/1976 | O'Keefe ............................... 427/4 X |

*Primary Examiner*—Shrive P. Beck
*Attorney, Agent, or Firm*—Blanchard, Flynn, Thiel, Boutell & Tanis

[57] ABSTRACT

Pearls, corals, shells and the like are composed mainly of calcium carbonate and, therefore, they have the disadvantages that they are weak mechanically and have poor resistance to salt. In the case of using those natural products as decorative accessories such as jewelry, it is possible to prepare accessories which are less likely to crack and are more resistant to perspiration while keeping the original luster characteristic of the natural products by coating the surfaces of those accessories with fluorides in order to improve the hardness of the surfaces, and then subjecting them to further treatment with silicon compounds and non-ionic surface active agents to improve the resistance of the surfaces against acids, alkalis and salts.

7 Claims, No Drawings

METHOD FOR IMPROVING THE PROPERTIES OF NATURAL PRODUCTS COMPOSED MAINLY OF CALCIUM CARBONATE

BACKGROUND OF THE INVENTION

The present invention relates to a method for improving the hardness and strength of natural products such as pearls, corals, shells, etc. which are composed mainly of calcium carbonate, and also to a method for providing them with resistance against acids, alkalis and salts, which increases the value of decorative accessories, such a necklace, ring, pendant, etc. made of such natural products.

Pearls, corals and shells have been widely used as accessories, such as a necklace, ring, pendant, etc., because they have a natural luster and they are rare. However, those natural products have the drawbacks that they are weak mechanically and have insufficient resistance against salt because the major component of those natural products is calcium carbonate. Accordingly, they are apt to be readily broken when they are dropped, they tend to crack when contacted with other hard objects, and they are readily damaged by salt in perspiration. Besides, there is the unfavorable possibility that the original luster characteristic of the natural products will be spoiled if a protective film is formed on the surfaces of those natural products in order to improve their hardness and to provide resistance against acids, alkalis and salts. A method for reinforcing and improving those natural products has been sought.

SUMMARY OF THE INVENTION

The present inventors have developed the present invention based on the result of an extensive study to overcome those drawbacks. The object of the present invention is to provide treated natural products which are less likely to crack, and are resistant to perspiration, while avoiding the possibility that their original luster will be reduced, by soaking the natural products which are composed of mainly calcium carbonate in a special solution to improve (1) the hardness of their surfaces, and (2) their resistance against acids, alkalis and salts.

Another object of the present invention is to provide a method for improving the quality of such natural products by subjecting their surfaces to pre-treatment which comprises making their surfaces hydrophilic, and then increasing their sensitivity and activity against the main treatment solution.

Further, another object of the present invention is to provide a method for improving the quality of such natural products which comprises utilizing a treatment solution consisting of mainly tin chloride, and then another treatment solution consisting of mainly palladium chloride at the time of the above pre-treatment, and subsequently treating the resulting surface with fluoride to make it harder.

Further, another object of the present invention is to provide a method for improving the quality of such natural products which comprises utilizing a treatment solution consisting of mainly silicon compounds and non-ionic surface active agents to improve their resistance against acids, alkalis and salts.

These and other objects, as well as the advantages and characteristics of the present invention, will become clear from the following description.

DESCRIPTION OF THE PREFERRED EMBODIMENT

The method of the present invention comprises a treatment to increase the hardness of the surfaces of natural products and/or a treatment to improve the resistance of the surfaces of natural products against acids, alkalis and salts after the hardening treatment. The steps of the entire method will be described one after the other.

First of all, an appropriate natural product, which consists mainly of calcium carbonate, such as a pearl, coral, or a shell is selected as an object to be subjected to treatment for improving its quality, and then the object is washed with water to remove fat. The object is soaked in a lauric acid solution and then is subjected to ultrasonic vibrations to wash it and to remove fat.

The object is then dried at normal temperature and then is subjected to the pre-treatment. This pre-treatment is indispensable and very important for the hardening treatment which will be described later. The pre-treatment comprises making the surface of the object hydrophilic, improving its sensitivity against the treatment solution, and activating the surface of the object to accelerate the reaction at the time of the main treatment. That is, the surface of the object, after drying at normal temperature, is washed with distilled water and soaked in a sensitising solution including tin chloride as a major component, and hydrochloric acid and hydrofluoric acid. The object of this treatment is to impart electrical conductivity to the surface of the object and to ionize it with stannous ions. In the following description, as well as in the foregoing description, the words "tin chloride" are used to mean "stannous" or "stannic" chloride. However, it is preferable to use stannous chloride.

After washing the object with water and drying it at normal temperature, it is then soaked in an activating solution including palladium chloride as a major component and hydrochloric acid. During this process, stannous ions on the surface of the object are replaced with palladium ions, which are then replaced with fluorine and silicon during the following treatments. The use of silver nitrate or copper or nickel in the place of palladium chloride was also considered: However, it was found that the use of those three metals is not favorable because silver nitrate is sensitive against sunshine and is unstable, and copper or nickel may damage the surface of the object and accordingly spoil its original luster.

After the pre-treatment described above, the object is washed with water, dried at normal temperature, and then subjected to the main treatment. The object is soaked in a treatment solution consisting of mainly a fluoride to harden its surface. Strontium fluoride is the most appropriate fluoride compound. It is necessary to adjust the pH of the above treatment solution within the range between 4.3 and 9.0, preferably 6.5 and 8.6. If the surface is subjected to a treatment at a pH outside the above range, the desired effect cannot be achieved because the surface of the object is damaged as time goes by. The treatment temperature and time vary depending upon the amount of the object to be treated and the time required for the entire cycle of treatment. A treating temperature of 18°–22° C. and a treating time of 60–180 sec. can preferably be adopted.

After washing the object with water and drying it at normal temperature, it is further subjected to treatment to provide the surface of the object with resistance against acids, alkalis and salts. At the time of the above treatment, the object is soaked in a treatment solution consisting of mainly silicon compound and a non-ionic surface active agent. During the above treatment, the palladium is replaced with silicon and the carbon component of a non-ionic surface active agent is bonded to said fluoride.

Silicon compounds to be used in such a treatment solution include complexes comprising mainly $SiH_4$ (silane) such as, for example, disilane, silanol, dimethyl cyclosilane, etc.: and non-ionic surface active agents include compounds obtained by adding ethylene oxide to higher alchols, amines, phenols, etc. The approriate temperature and time of the above treatment are 80°–100° C. and approximately 10 minutes respectively.

After the aforementioned main treatment, the object is washed with water again, and dried at normal temperature to obtain a treated natural product having the desired characteristics.

The following examples are given to illustrate the present invention.

EXAMPLE 1

A small piece of coral was washed with water to remove fat, and then was soaked in about 0.5 l. of a solution prepared by adding 50 g/l of tin chloride and 5 cc/l each of hydrochloric acid and hydrofluoric acid to distilled water at the temperature of 22° C., for 13 minutes to conduct the pre-treatment. The resulting object was washed with water and dried. This pre-treatment helps the chemicals used for the next processes to work better.

A second pre-treatment was also carried out by soaking the object in about 0.5 l. of a solution containing 2 g/l of palladium chloride and 5 cc/l of hydrochloric acid at the temperature of 22° C. for 20 minutes, and then it was washed with water and dried. This treatment is indispensable to accelerate the reaction of the next step.

The surface of above coral was subjected to a hardening treatment with a fluoride, i.e. 2 g/l of strontium fluoride was used as a fluoride and said small piece of coral was soaked in the solution of strontium fluoride at the temperature of 25° C., at a pH of 6.5–8.6 for 30 sec. and washed with water and dried.

The small piece of coral which was treated according to the above method has obviously increased hardness compared to an untreated one, and besides damage of its original luster cannot be observed.

EXAMPLE 2

The small piece of coral obtained in Example 1 was subjected to the surface treatment with a silicon compound and a non-ionic surface active agent. The object was soaked in about 0.5 l. of a solution including silicon compound No. 3508 prepared by Kanto Denka Kogyo Ltd. and a non-ionic surface active agent with the trade name of "Liponox" supplied by Nippon Yushi Co. (Nippon Oil & Fats Co.) at a temperature of 90° C., for about 10 minutes and then washed with water and dried. It was confirmed that resistance against acids, alkalis and salts was conferred on to the surface of said small piece of coral which was subjected to the above treatment.

The aforementioned silicon compound No. 3508 prepared by Kanto Denka Kogyo Ltd. has the formula of $BF_3$: and "Liponox" prepared by Nippon Yushi Co. comprises polyoxyethylene nonylphenyl ether,

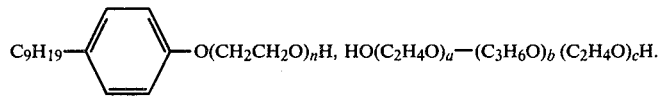

EXAMPLE 3

A pearl, used in place of a coral, was subjected to the same treatment as in the Examples 1 and 2. An increase in its hardness and improvement of its resistance against acids, alkalis and salts were observed as well as in the case of coral. Besides, the original luster of the pearl was retained.

EXAMPLE 4

Coral and pearl obtained by the method for improving their quality according to the present invention and ordinary coral and pearl without any treatment were soaked in 100 ml. of a solution prepared by adding desalted water into 5 ml of reagent-super grade hydrochloric acid (36%, Sp. Gr. 1.18) at room temperature for 1 minute. The results observed are as follows:

Coral (Untreated): Bubbles were vigorously generated immediately after being soaked in the solution, and they rose up in the form of small bubbles.

Coral (Treated): Approximately 10 sec. after being soaked in the solution, its entire surface was covered with bubbles having a diameter of about 1 mm and 1–2 bubbles rose up about every 10 sec.

Pearl (Untreated): Bubbles having a diameter of about 2 mm were generated immediately after being soaked in the solution and 1–2 bubbles rose up every 2 sec.

Pearl (Treated): 5–6 bubbles having a diameter of about 0.2–0.3 mm were adhered to the surface of pearl approximately 10 sec. after being soaked in the solution and no rise of bubbles was observed.

As described in the above, the quality of pearls, corals, and other shells can be very easily improved: and, accordingly the value of necklaces, ear rings, pendants and rings made of those materials can be made very high.

What is claimed is:

1. A method for reinforcing a natural product which is characterized in that calcium carbonate constitutes the main component of said natural product, which comprises the steps of: (1) soaking said natural product in a pretreatment solution containing a major amount of tin chloride and also containing hydrochloric acid and hydrofluoric acid whereby to make the surface of said natural product hydrophilic, to activate the surface of said natural product by making the surface of said natural product electrically conductive and to make stannous ions present thereon; (2) then soaking said natural product obtained in step (1) in a solution containing a major amount of palladium chloride and also containing hydrochloric acid whereby to replace said stannous ions on the surface of said natural product by palladium ions; (3) then soaking said natural product obtained in step (2) in a fluoride solution having a pH of from 4.3 to 9.0 to harden its surface; and (4) then soaking said natural product obtained in step (3) in a solution of a silane compound and a nonionic surface active agent to confer on said natural product improved resistance against acids, alkalis and salts.

2. The method of claim 1 wherein the fluoride in said fluoride solution is strontium fluoride.

3. The method of claim 1 or claim 2 wherein the pH of said fluoride solution is from 6.5 to 8.6.

4. The method of claim 1 or claim 2 wherein said silane compound is selected from the group consisting of disilane, silanol and dimethyl cyclosilane.

5. The method of claim 1 or claim 2 wherein said silane compound is dimethyl cyclosilane.

6. The method of claim 1 wherein said nonionic surface active agent is an ethylene oxide adduct of a higher alcohol, amine or alkylphenol.

7. The method of claim 1 wherein said nonionic surface active agent is polyoxyethylene nonylphenyl ether.

* * * * *